May 2, 1967   J. A. DURGOM   3,317,214
PIPE JOINT ASSEMBLY
Filed Nov. 4, 1964
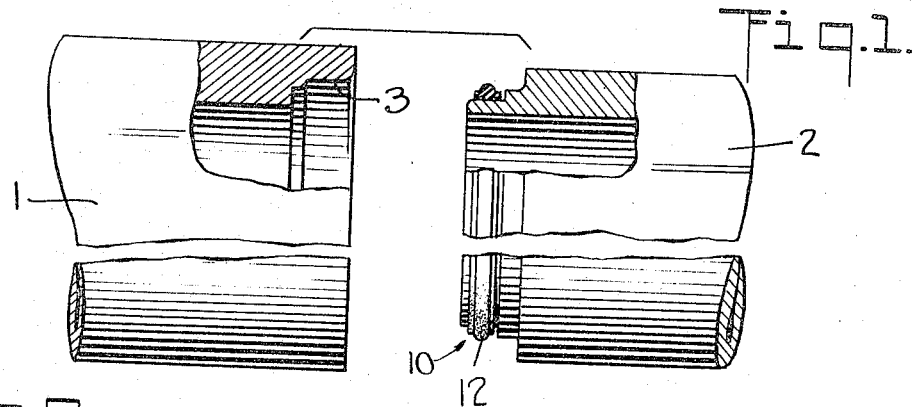
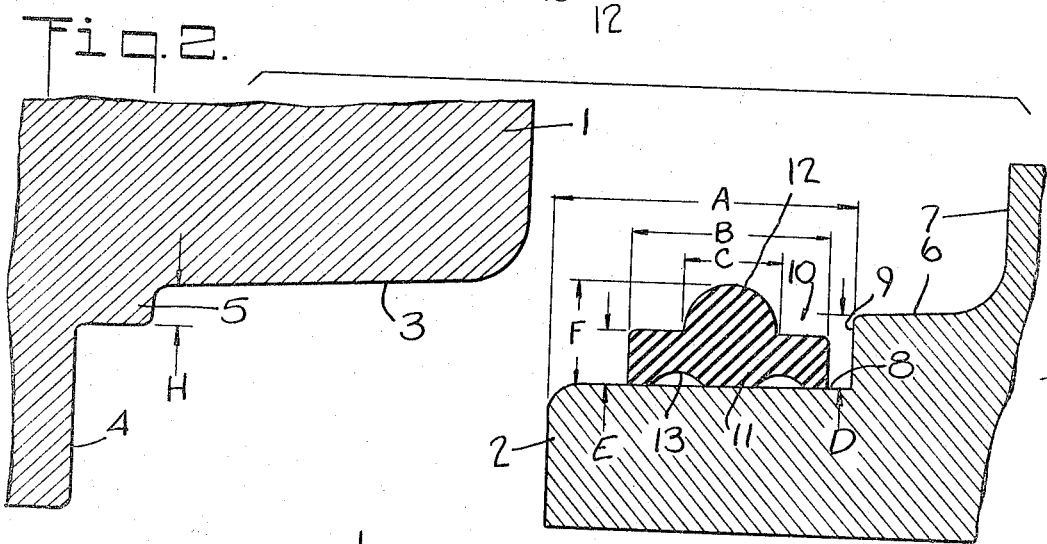
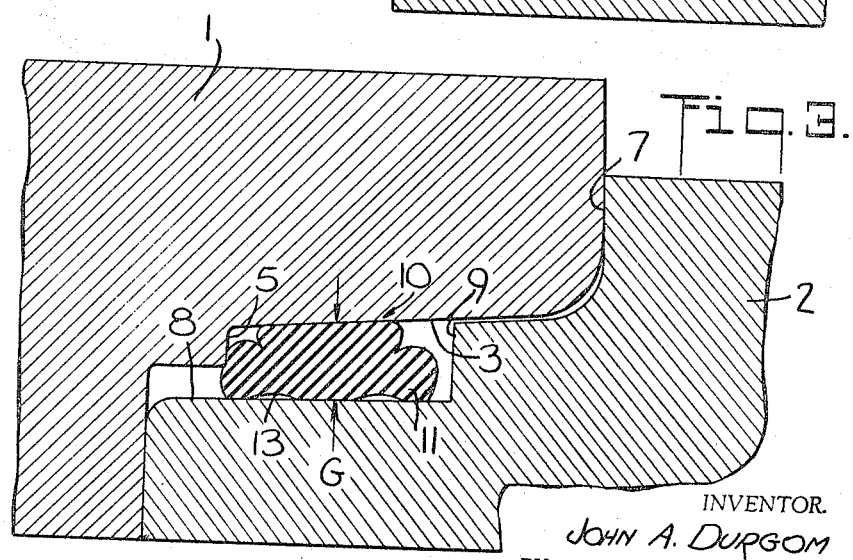
INVENTOR.
JOHN A. DURGOM
BY
ATTORNEY

United States Patent Office 3,317,214
Patented May 2, 1967

3,317,214
PIPE JOINT ASSEMBLY
John A. Durgom, Rockton, Ill., assignor to Leanel Corporation, Rockton, Ill., a corporation of Illinois
Filed Nov. 4, 1964, Ser. No. 408,990
2 Claims. (Cl. 277—170)

The present invention relates to seals for pipe joints and in particular to seals for the joints between sections of bell and spigot pipes or for sleeves having such coupling portions for connecting pipes.

The seal of the present invention finds particular application for the connection of large ceramic or cement pipes of the type normally used underground for water or drainage systems. The seal is not, however, limited to such pipes nor to any particular size but it will be apparent from the following description that the seal is particularly advantageous for such piping in larger sizes wherein it provides a seal with improved installation and maintenance characteristics not heretofore available in seals of this general type.

The coupling and effective sealing of sections of larger and heavier piping presents particular problems since the weight and size of such pipes and their normal installation in open channels or trenches in the ground makes precise handling and positioning of the pipe sections extremely difficult. Pipe lines of this general type are also subject to subsequent stress and strain or minor dislocation due to the movement of the surrounding earth or other supports. It will be seen therefore that a preferred seal for these pipes must be of such a nature that it can be quickly, simply, and effectively installed in a fool-proof manner permitting the joint to be formed by practical manipulations of the pipe sections and without requiring precision alignment or precise gasket manipulations during the final portions of the joint assembly.

In a typical pipe installation of such heavier pipes, the pipe section being installed must first be lowered into the pipe trench and during the lowering and subsequent handling this section must be properly aligned. Known sealing gaskets require a time consuming and difficult alignment for obtaining a proper seal which is expensive and time consuming and in some circumstances is almost impossible to do correctly resulting in improper seals.

Before or after this lowering and aligning operation, the sealing gasket must be applied to one or the other of the pipe members and with most present gaskets a particular orientation is required together with a predetermined positioning on the pipe. Such operations present additional problems particularly for workers with ordinary skills and again present the possibility of an improper joint due to the omission or improper performance of the various gasket handling steps. With present gasket designs, the final pulling home of the pipe sections must also be extremely carefully and deliberately done to prevent a rolling of the gasket sealing surfaces and to insure a special cooperation of all gasket elements to obtain the desired seal.

It is readily apparent that such operations are extremely difficult and often cannot be properly performed with heavier or longer pipe sections where operations of the desired criticalness and sensitivity cannot be carried out with regular field equipment and personnel.

The gasket and cooperating joint of the present invention provide a tight and sure seal which is quickly and easily applied without requiring the use of precise and sensitive manipulation and where slight misalignments do not impair the completed joint. In addition, the gasket portion of the seal provides the necessary sealing properties without incorporating elements which in themselves are easily dislocated or rolled during the final joint assembly. A gasket of uniform cross section is provided which eliminates any possibility of improper placement and which cooperates with the novel related pipe sealing surfaces to provide an easily assembled and long-lasting seal.

Accordingly, an object of the present invention is to provide an improved pipe joint assembly.

Another object of the present invention is to provide an improved pipe joint assembly which is easily applied for larger sizes of pipe.

Another object of the present invention is to provide an improved cooperating pipe gasket and pipe joint configuration for pipe joint assembly requiring a minimum of manipulation.

Another object of the persent invention is to provide an improved sealing gasket for pipe joints.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side elevational view of the bell and spigot portions of pipe sections incorporating the improved pipe joint assembly of the present invention;

FIG. 2 is an enlarged fragmentary sectional view of the pipe joint assembly of FIG. 1 illustrating the sealing gasket in its unsealed form; and FIG. 3 is an enlarged fragmentary sectional view corresponding to FIG. 2 showing the pipe joint as assembled.

The drawing illustrates a preferred embodiment of the pipe joint assembly having bell and spigot portions on typical pipe sections. The bell 1 and spigot 2 are illustrated as forming opposite end portions of pipe sections, however, it is clear that a similar joint may be incorporated into coupling sections or other portions of conduits as desired.

The bell 1 has an internal guide surface 3 terminating in a radially directed stop 4. A longitudinal projection 5 is preferably provided between the guide surface 3 and the stop 4 to facilitate seal gasket insertion as will be more fully described below. The guide surface 3 preferably is flared a few degrees to facilitate the joint assembly.

The cooperating end of the spigot 2 includes a reduced diameter coupling portion 6 terminating in a radially directed stop 7 and preferably also includes a recessed tongue 8 terminating at a shoulder 9 and having a generally cylindrical surface to accommodate a sealing washer 10.

FIG. 2 illustrates the details of the bell 1 and spigot 2 with a sealing gasket 10 of the preferred form mounted in position on the spigot 2 preparatory to the final completion of the joint when the bell 1 and the spigot 2 are assembled or pressed home in the pipe laying or assembly operation as described above. As illustrated in FIG. 3, it is seen that the projection 5, the guide surface 3, the shoulder 9, and the tongue 8 cooperate to provide an annular gasket receiving channel when the bell 1 and spigot 2 are assembled. It is also clear that during assembly, the projection 5 which has been preformed in the molding of the bell 1 acts to engage the edge of the gasket 10 to hold or slide it into the proper sealing position while the shoulder 9 on the spigot cooperates in keeping the gasket 10 within the annular sealing channel. While in the preferred embodiment it is desirable that spacing be provided between the gasket 10 and the spigot shoulder 9 particularly during the joint assembly, this spacing is not required and the gasket 10 may abut the stop 9. In the preferred method of assembly, the gasket 10 as applied to the spigot 2 is fitted over the tongue 8 and is spaced from the spigot stop 9. When the pipe sections are assembled, the projection 5 on the bell 1 insures axial movement of the gasket 10 the necessary amount on the tongue 8 and the remaining space between the gasket 10 and the stop 9 permits a bulging of the adjacent portion of the gasket 10 as the gasket 10 is forced radially inwardly to occupy the sealed position illustrated in FIG. 3.

FIG. 2 illustrates the preferred cross section and shape of the sealing gasket 10 to provide the necessary sealing action in cooperation with the above described bell 1 and spigot 2. FIG. 3 illustrates the gasket 10 in its sealed position in a fully assembled pipe joint and pressed between guide surface 3 of the bell 1 and the tongue 8 of the spigot 2.

The gasket 10 is made of synthetic or natural rubber or similar material which is resiliently deformable. Gaskets 10 may be supplied as pre-formed rings sized to fit a particular diameter of pipe or they may be supplied in rolls of indeterminate length suitable for being cut into strips as required so that they may be applied to pipes and have their ends effectively cemented or fused or otherwise joined on the pipe surfaces.

A preferred cross section of the gasket is illustrated in FIG. 2. It comprises a generally rectangular base portion 11 provided to stabilize the gasket 10 on the spigot 2 and to provide a seal with the spigot tongue 8. A radially outwardly projecting rib 12 of generally semi-circular cross-section projects from the base 11 to form a seal with the bell 1 and to transmit the sealing pressure to the gasket base 11 when the joint is made.

The base portion 11 of the gasket 10 preferably has an elongated rectangular shape to provide a stabilizing action. A satisfactory proportion for the base length B and height E has been found to be about 4 to 1 to provide the proper sealing action in combination with the generally semi-circular rib 12 whose diameter C may be about ½ of the length B of the base. With these proportions of the base 11 and the sealing rib 12, a radial dimension or height F for the preferred gasket 10 will be about ½ of the length B of its base 11. These general proportions have proven effective both in providing a satisfactory sealing action and in stabilizing the gasket cross sectional shape during the assembly operation as the spigot 2 is moved into the bell 1. It also permits a progressively increasing pressure to be applied to the gasket 10 as the gasket 10 conforms itself to the desired flattened sealing shape illustrated in FIG. 3 while leaving a relatively square corner portion on the base 11 to cooperate with the projection 5 on the bell 1 to properly locate the gasket 10 on the spigot 2 during the initial portion of the joint assembly as the spigot 2 commences to move into the flared end of the bell 1.

The tongue 8 of the spigot 2 has a dimension A substantially greater than the length B of the gasket base 11 to provide a stable support for the base 11 and to permit the joint to be assembled readily and without requiring a precise spacing of the gasket 10 in the first instance. This permits the desired spacing between the gasket 10 and the spigot shoulder 9 and also provides a marginal end portion of the spigot tongue 8 to insure the retention and seating of the gasket 10 before and during the joint assembly. Preferably this spigot tongue has a length A of at least about 1 and ½ times the length B of the gasket base 10. The height D of the spigot shoulder 9 is greater than the height E of the gasket base 11 to insure freedom of action during assembly and to prevent interference between the end of the bell 1 and the gasket 10 as the pipe sections are assembled to complete the joint. In the preferred embodiment illustrated, this shoulder is about 1 and ½ times the height E of the gasket base 11, however, this dimension may be increased and is not critical as long as it exceeds the gasket base 11 height E.

As indicated above, the projection 5 on the bell 1 insures the correct axial positioning of the gasket 10 during the joint assembly. This projection extends radially inwardly a distance H to insure an overlap with the gasket base 11 and preferably engages an appreciable area of the gasket base 11 as illustrated.

In order to form a tight seal it is necessary to have the gasket 10 under considerable pressure to provide an initial tight seal and to provide a seal which will retain its effectiveness for indefinite periods and during possible movement of the connected pipe sections. In the preferred form of the pipe joint assembly illustrated, the gasket height F is reduced by approximately 25% at its central portion G where the gasket is formed of material of synthetic rubber to obtain such a pressure and to have the gasket assume the sealing position generally as illustrated. In order to facilitate the formation of the tight seal between the bottom surface of the gasket 10 and the tongue 8 of the spigot 2, a pair of grooves 13 are provided in the gasket base 11. Two grooves 13 uniformly spaced lengthwise of the gasket base 11 having an original depth of about ¼ of the gasket height E, provide a satisfactory sealing action with the uniform position of the grooves helping to stabilize the base 11 during the above described assembly and sealing action.

The preferred gasket 10 as described above is seen to have a uniform cross section permitting the gasket 10 to be applied either way to the pipe spigot 2 eliminating any special precautions in this regard and thus facilitating the assembly of the pipe joints.

It will be seen that an improved pipe assembly has been provided with a new bell and spigot shape and including an improved gasket cooperating therewith in forming a sealed pipe joint. The improved pipe joint assembly is particularly useful for larger pipes such as ceramic or cement pipes as it is easily assembled without requiring any special precautions or any particular skills. This adapts the joint for providing quickly-made and tight seals even where the size or weight of the pipes makes precision handling or alignment difficult or impossible and it also adapts the new joint assembly for use under widely varying field conditions.

The new pipe joint is particularly advantageous in that the gasket has a uniform cross section providing remarkable stability so that during joint assembly the bell and spigot may be drawn rapidly together and without requiring the fine alignment or leveling adjustments for pipe sections as now required with the present gaskets of this general type.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A pipe joint assembly comprising the combination of cooperable bell and spigot members, said bell having an inner flared guide surface terminating in a generally radially directed stop and having an annular projection with a radially directed outer surface in the corner intermediate said guide surface and said stop, said spigot having a coupling portion of reduced diameter for entering within said annular guide surface of said bell and having a radially directed shoulder defining a further reduced diameter tongue providing an annular gasket accommodating channel in cooperation with the guide surface and projection and said spigot shoulder when said coupling portion is within the bell, an annular gasket of resiliently deformable material encircling said spigot tongue, said gasket having a cross section comprising a generally rectangular axially elongated base having its bottom engaging said spigot tongue and having a generally semi-circular rib extending radially outwardly centrally of said base for engaging said guide surface of said bell, one or more annular grooves in the bottom of said gasket base, the radial height of said shoulder on said spigot being greater than the radial height of said gasket base, the radially directed surface of said projection engaging one end of said gasket base and the opposite end of said gasket base being positioned adjacent to said shoulder, and said gasket cross sectional height in a radial direction being greater in an unstressed condition than the radial height of the gasket accommodating channel between said spigot tongue and said bell flared guide surface.

2. The pipe joint assembly as claimed in claim 1 in which said gasket base has a length of about four times its height, said annular grooves having a groove depth of about one-quarter of the base height, said rib having a height of about one-half the base length, and said gasket height being about three-quarters its original height when pressed into sealing position in said channel in the completed joint.

References Cited by the Examiner

UNITED STATES PATENTS

| 3,048,415 | 8/1962 | Shook | 277—170 |
| 3,059,941 | 10/1962 | Kayner et al. | |
| 3,147,014 | 9/1964 | Ohnstead. | |
| 3,185,490 | 5/1965 | Gagne | 277—170 |

FOREIGN PATENTS 842,245    7/1960    Great Britain

SAMUEL ROTHBERG, *Primary Examiner.*